(12) United States Patent
Hitomi

(10) Patent No.: US 12,743,950 B2
(45) Date of Patent: Sep. 22, 2026

(54) REMOTE CONTROL (INFRARED TRANSMITTER) INCLUDING REFLECTOR WITH EDGE

(71) Applicant: Kabushiki Kaisha Keijitsu, Kanagawa (JP)

(72) Inventor: Yukio Hitomi, Kanagawa (JP)

(73) Assignee: KABUSHIKI KAISHA KEIJITSU, Kanagawa (JP)

(*) Notice: Subject to any disclaimer, the term of this patent is extended or adjusted under 35 U.S.C. 154(b) by 246 days.

(21) Appl. No.: 18/693,949

(22) PCT Filed: Jun. 3, 2022

(86) PCT No.: PCT/JP2022/022617
§ 371 (c)(1),
(2) Date: Mar. 21, 2024

(87) PCT Pub. No.: WO2023/047712
PCT Pub. Date: Mar. 30, 2023

(65) Prior Publication Data

US 2024/0395132 A1 Nov. 28, 2024

(30) Foreign Application Priority Data

Sep. 22, 2021 (JP) ................................ 2021-154626

(51) Int. Cl.
*G08C 23/04* (2006.01)
*G02B 5/20* (2006.01)

(52) U.S. Cl.
CPC .............. *G08C 23/04* (2013.01); *G02B 5/208* (2013.01)

(58) Field of Classification Search
CPC ................ G08C 23/04; G08C 2201/40; G08C 2201/32; G08C 2201/41; G08C 2201/93; G08C 2201/91; G08C 2201/92; H04B 1/202; H04B 1/205; H04B 10/1121; H04B 10/1143; H04B 10/1149; G02B 5/208; G11B 15/023
See application file for complete search history.

(56) References Cited

U.S. PATENT DOCUMENTS 12,013,265 B2 * 6/2024 Chen .................. G01D 5/35367
2012/0327030 A1 * 12/2012 Hsieh .................... G08C 23/04
345/175

FOREIGN PATENT DOCUMENTS

| | | | | | |
|---|---|---|---|---|---|
| JP | S64051795 A | | 2/1989 | | |
| JP | H09320534 A | | 12/1997 | | |
| JP | 2001218288 A | * | 8/2001 | | |
| JP | 2007013251 A | * | 1/2007 | ............... | H04Q 9/00 |
| JP | 2007300218 A | | 11/2007 | | |
| JP | 2011124736 A | | 6/2011 | | |
| JP | 1562201 S | | 10/2016 | | |

* cited by examiner

*Primary Examiner* — Hibret A Woldekidan
(74) *Attorney, Agent, or Firm* — HAUPTMAN HAM, LLP

(57) ABSTRACT

A remote control including an infrared lamp includes a reflector that controls reflection of infrared rays emitted from the infrared lamp at a tip end portion of the remote control.

3 Claims, 22 Drawing Sheets

FIG. 4EXA
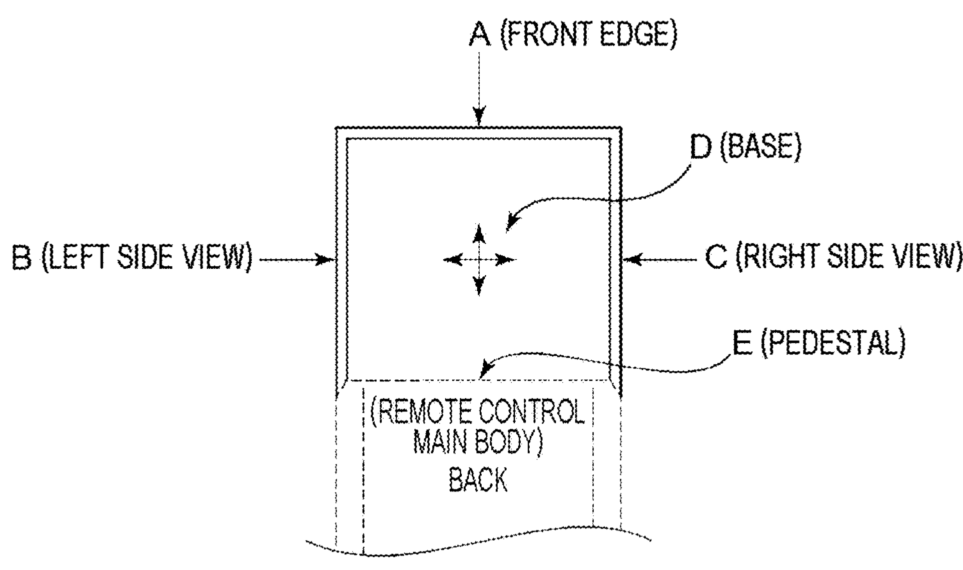
FIG. 4EXB
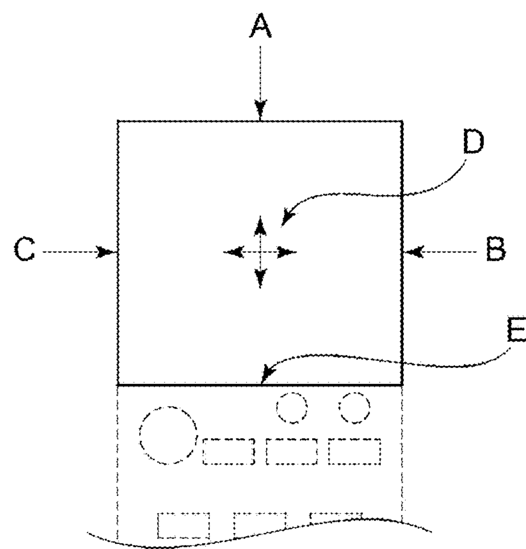

REMOTE CONTROL (INFRARED TRANSMITTER) INCLUDING REFLECTOR WITH EDGE

CROSS-REFERENCE TO RELATED APPLICATIONS

This application is national stage application of International Application No. PCT/JP2022/022617, filed on Jun. 3, 2022, which claims the benefit of priority from Japanese Patent Application No. 2021-154626, filed on Sep. 22, 2021.

TECHNICAL FIELD

The present invention relates to a remote control used to turn on the power or remotely change the channel or the mode of a television, an air conditioner, a lighting device, or the like.

BACKGROUND ART

For example, with the diversification of devices operated by a remote control, such as televisions, air conditioning devices, and lighting devices, the operation has become complicated.

At the same time, the remote control has been improved to include a plurality of infrared lights, and it has become possible to incline the remote control when a user operates it while viewing the operation panel.

The following conventional techniques exist for remote controls.

CITATION LIST

Patent Literature

Patent Literature 1: JP 2011-124736 A
Patent Literature 2: Design Registration No. 1562201
Patent Literature 3: JP 2007-300218 A

SUMMARY OF INVENTION

Technical Problem

However, it is not easy for people who cannot move their fingers, arms, and body as they wish due to disease, injury, aging, and congenital or acquired onset of disease to operate the current remote control.

In particular, as for television-related devices, DVD devices, game machines, and cable television connection devices are installed around the television.

Each channel number of these has three digits, and the user needs to view the operation panel when operating the remote control.

In order to do so, the user needs to hold the remote control with one hand and to do channel operation with the other hand in a similar manner to that when operating a mobile phone (FIG. 1).

In addition, depending on the degree of physical disability, there is a demand for a remote control that not only enables the user to operate it with one hand (FIG. 2) but also enables the user to operate it in a wide range while lying on a Japanese mattress called a futon or a bed or sitting behind a desk or a table, under a Japanese warming table called a kotatsu, or the like.

Solution to Problem

In order to solve the above problems, a remote control according to the present invention includes a reflector that controls reflection of infrared rays emitted from an infrared lamp at a tip end portion of the remote control.

Also, in order to solve the above problems, the reflector of the remote control according to the present invention includes a front edge, a left side edge, a right side edge, and a base.

Advantageous Effects of Invention

According to the present invention, it is not necessary to aim the tip end of the remote control at the target device. Therefore, it is possible for the user to operate the remote control without raising their body from the bed or the chair, and for a patient or a person with disabilities to operate the remote control while lying on the bed or the futon or while holding the remote control sideways.

In other words, even in a case where the user is lying on the bed or the futon, the operator can operate the remote control while viewing the operation panel of the remote control sideways without aiming the tip end of the remote control at the target device such as a television and an air conditioner. In addition, although this reflector has a single infrared light, it is remarkable that the reflector has high functionality and improved convenience as compared to a currently used remote control including a plurality of infrared lights.

BRIEF DESCRIPTION OF DRAWINGS

FIG. 4EXA is a figure with a name of each part of the reflector attached as an auxiliary figure.

FIG. 4EXB is a figure with a name of each part of the reflector attached as an auxiliary figure.

FIG. 7-01A is the same view as FIG. 4C, and is an enlarged view of the side surface of the reflector of the remote control in FIGS. 3A to 3D.

FIG. 7-01B is an enlarged view of a cross section of the side surface of the reflector of the remote control in FIG. 7-01A.

FIG. 7-01C is an enlarged view of the cross section of the side surface of the reflector of the remote control in FIG. 7-01B, in which the left side edge B is omitted. For convenience of description, B (left side edge) of the reflector is omitted.

FIG. 7-01D illustrates reflection of infrared rays in FIG. 7-01C. This is a diagram that answers the question raised in the supplement to FIGS. 6A and 6B.

FIG. 7-02E illustrates reflection of infrared rays in FIG. 7-01C.

FIG. 7-02F illustrates reflection of infrared rays in FIG. 7-01C.

FIG. 7-02G illustrates reflection of infrared rays in FIG. 7-01C.

FIG. 7-02H illustrates reflection of infrared rays in FIG. 7-01C.

FIGS. 16-01A to 16-01D are explanatory views of a mode of a reflector obtained by improving the basic reflector according to the present invention and the entire remote control.

FIG. 16-01A is a side view of the entire remote control including the reflector obtained by improving the basic reflector according to the present invention.

FIG. 16-01B is a perspective view of the reflector obtained by improving the basic reflector according to the present invention.

FIG. 16-01C is an enlarged view of the side surface of the reflector obtained by improving the basic reflector according to the present invention.

FIG. 16-01D is an enlarged view of the head portion of the reflector obtained by improving the basic reflector according to the present invention.

FIG. 16-02E is a front view of the entire remote control including the reflector obtained by improving the basic reflector according to the present invention.

FIG. 16-02F is an enlarged view of the front surface of the reflector obtained by improving the basic reflector according to the present invention.

FIG. 16-03G is a back view of the entire remote control including the reflector obtained by improving the basic reflector according to the present invention.

FIG. 16-03H is an enlarged view of the back surface of the reflector obtained by improving the basic reflector according to the present invention.

FIG. 17A is a top view of the entire remote control including a reflector according to another embodiment of the present invention.

FIG. 17B is a cross-sectional view of FIG. 17A.

FIG. 17C is a cross-sectional view of the side surface of the entire remote control including the reflector according to the other embodiment of the present invention.

FIG. 17D is a diagram in which the left side edge is omitted from FIG. 17C.

Figure 1:
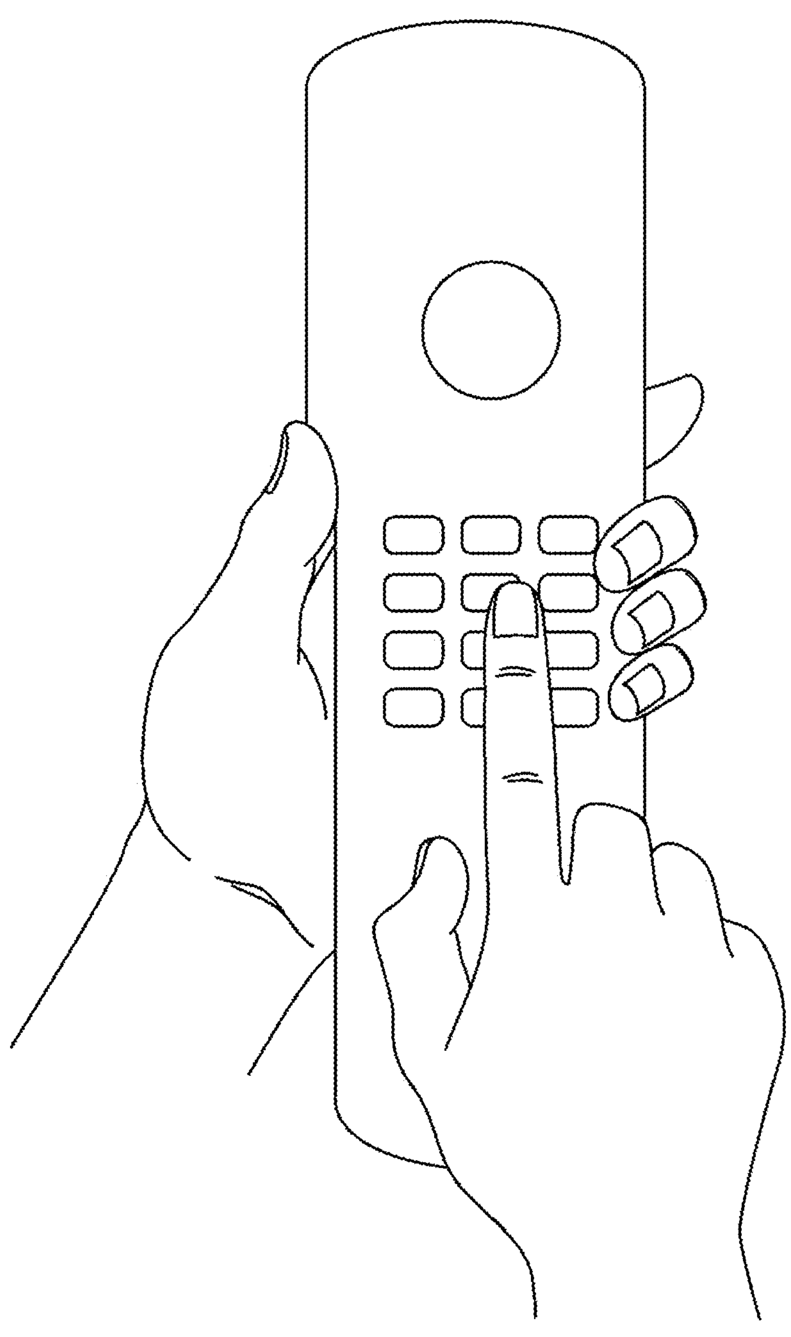
FIG. 1 is a diagram in which a remote control is operated with both hands.
Figure 2:
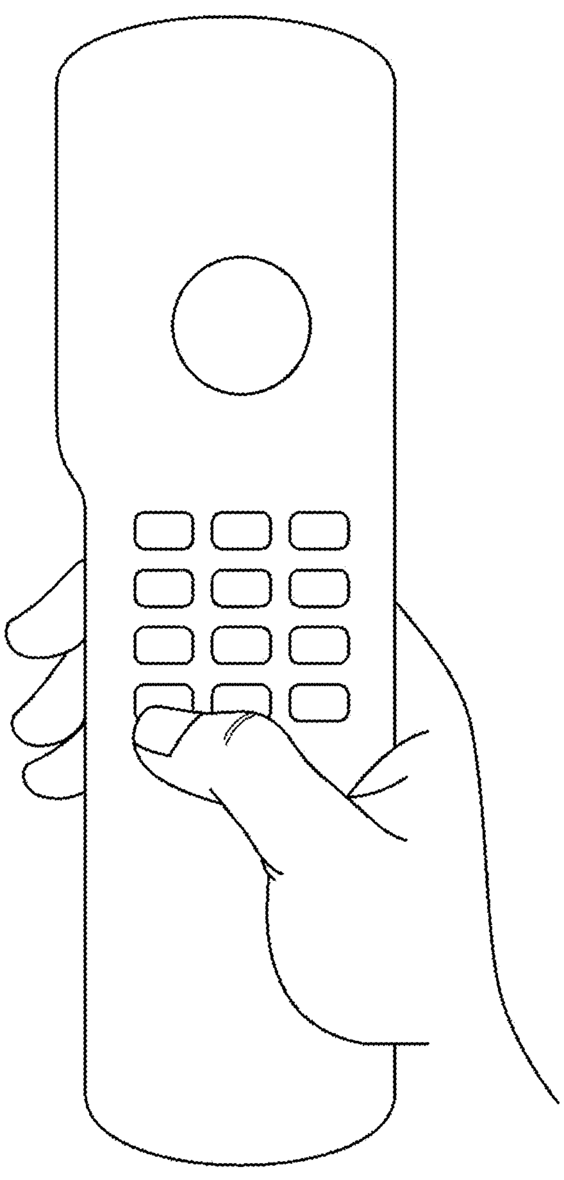
FIG. 2 is a diagram in which the remote control is operated with one hand.
Figure 3A:
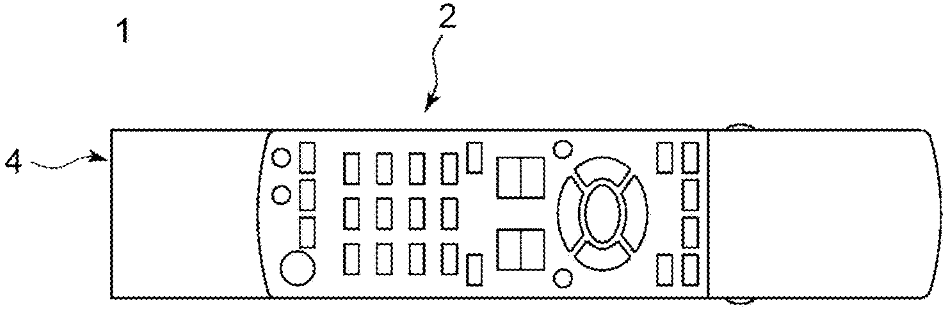
FIG. 3A is a front view of the entire remote control including a basic reflector according to the present invention.
Figure 3B:
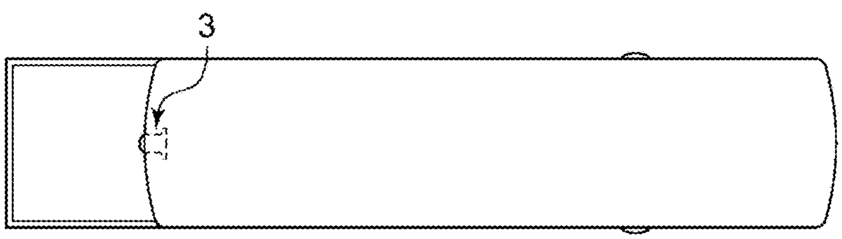
FIG. 3B is a rear view of the entire remote control including the basic reflector according to the present invention.
Figure 3C:
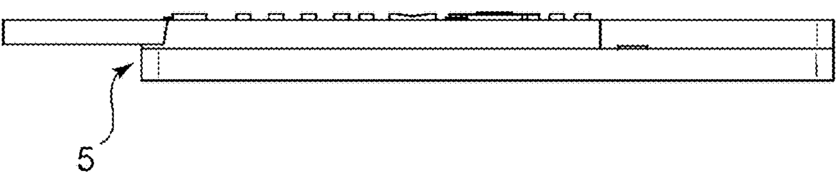
FIG. 3C is a side view of the entire remote control including the basic reflector according to the present invention.
Figure 3D:
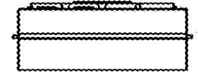
FIG. 3D is a top view of the entire remote control including the basic reflector according to the present invention.
Figure 4A:
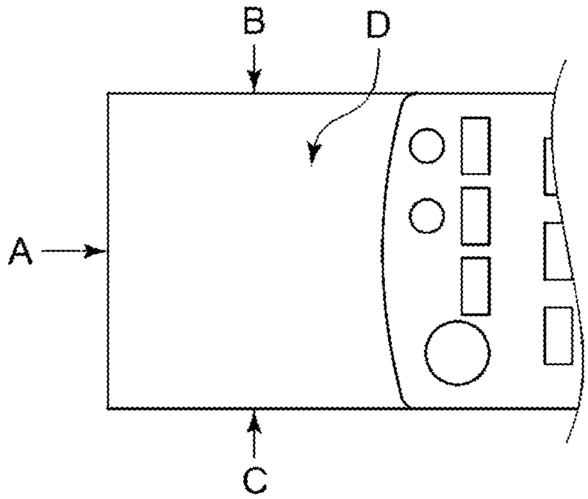
FIG. 4A is an enlarged view of the front surface of the reflector of the remote control in FIGS. 3A to 3D.
Figure 4B:
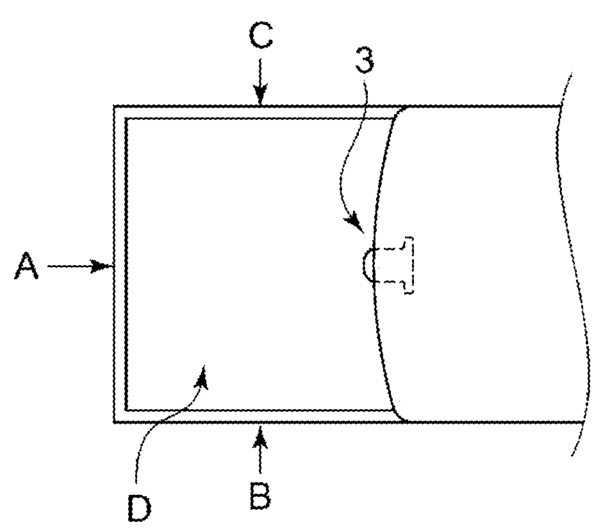
FIG. 4B is an enlarged view of the back surface of the reflector of the remote control in FIGS. 3A to 3D.
Figure 4C:
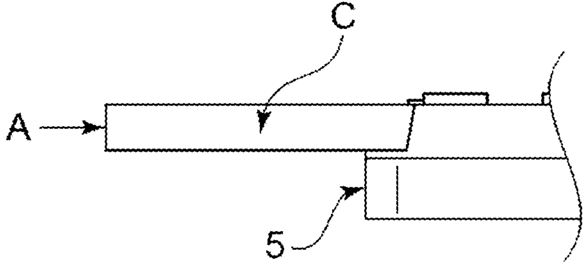
FIG. 4C is an enlarged view of the side surface of the reflector of the remote control in FIGS. 3A to 3D.
Figure 4D:
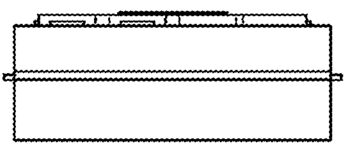
FIG. 4D is an enlarged view of the head portion of the reflector of the remote control in FIGS. 3A to 3D.

Hereinbelow, embodiments of the present invention will be described with reference to the accompanying drawings.

DESCRIPTION OF EMBODIMENTS

First Embodiment

The present invention can be widely applied to a remote control having an infrared lamp. Here, a remote control for television will be described as an example of such a device.

As illustrated in FIGS. 3A to 3D, and 6, a remote control 1 according to an embodiment of the present invention is a remote control for television. An infrared lamp 3 and a reflector 4 that controls infrared rays emitted from the infrared lamp 3 are provided at the tip end portion (head portion) of a remote control main body 2 as a device main body. The device main body 2 is provided with a pedestal 5.

The configuration of the reflector 4 will be described with reference to FIGS. 4A to 4D. A figure with names (FIGS. 4EXA and 4EXB) is attached as an auxiliary figure.

The reflector 4 is provided at the head portion of the remote control main body 2, and includes a front edge A, a left side edge B and a right side edge C on the left and right sides, and a base D.

The reflector 4 further includes the pedestal 5, which is an emitting surface of the infrared lamp 3 at the head portion of the remote control main body 2. The pedestal 5 is specially formed (vertically formed).

The base D, the three edges (A, B, and C), and the pedestal 5, which is the emitting surface of the infrared lamp 3, prevent infrared rays emitted from the infrared lamp 3 from diffusing in the upper, lower, left, right, and back directions.

Figure 5A:
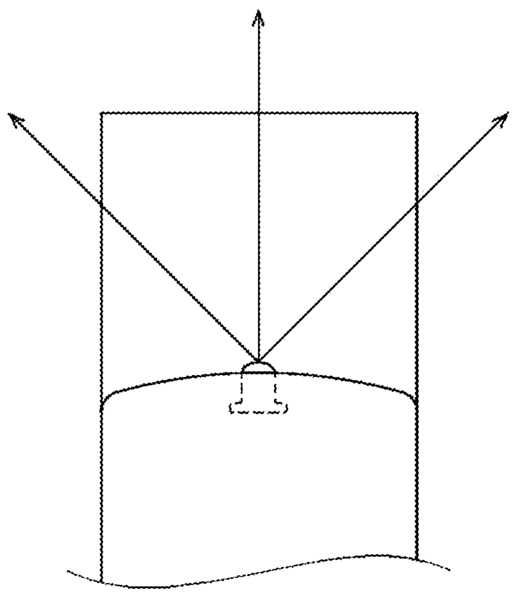
FIG. 5A is a diagram of a reflector with no edges, illustrating reflection of infrared rays. This is a diagram for explaining diffusion of infrared rays in a case where the reflector does not include A (front edge), B (left side edge), and C (right side edge).
Figure 5B:
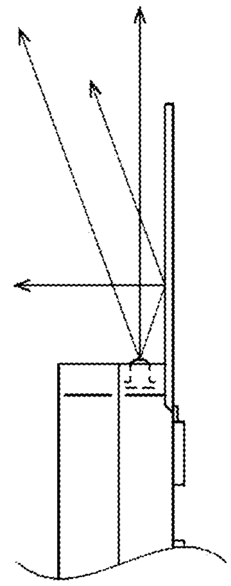
FIG. 5B is a diagram of the reflector with no edges, illustrating reflection of infrared rays. This is a diagram for explaining diffusion of infrared rays in a case where the reflector does not include A (front edge), B (left side edge), and C (right side edge).

If the front edge A, the left side edge B, and the right side edge C are not provided as illustrated in FIGS. 5A and 5B, a large number of infrared rays will diffuse from the base D.

However, by providing the front edge A, the left side edge B, the right side edge C, and the pedestal E, it is possible not only to prevent diffusion of infrared rays and increase each reflective force, but also to efficiently emit infrared rays to the device to be operated as illustrated in FIGS. 7-01A to 7-01D and 7-02E to 7-02H.

This can be done in such cases as aiming the head portion of the remote control to the device to be operated, erecting the remote control, and turning the remote control sideways.

For this reason, people with disease or disabilities can easily operate the remote control while lying on the futon or the bed.

Figure 6A:
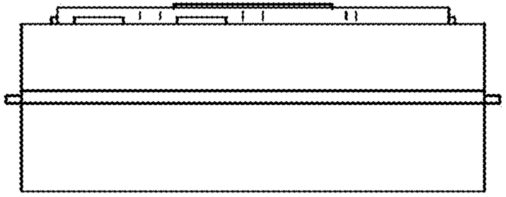
FIG. 6A is an enlarged view of the head portion of the reflector of the remote control in FIGS. 3A to 3D. The front edge A of the reflector covers an infrared light.
Figure 6B:
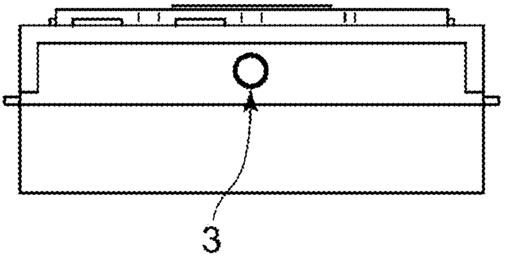
FIG. 6B is an enlarged view of a cross section of the head portion of the reflector of the remote control in FIG. 6A. This is a diagram that raises the question of why infrared rays can be reflected in the front direction of the remote control, that is, beyond the front edge A, although the front edge A of the reflector covers the infrared light.

One of the major features of this reflector is the role of the front edge A. As illustrated in FIG. 6A, the front edge A of the reflector covers the infrared light.

The reason why infrared rays can be reflected forward in such a state will be described.

First, as one of the conditions, it will be stated that acrylic or the like that lets infrared rays pass therethrough is not used as the material for the reflector.

A ready-made black remote control was used in the experiment.

Then, a reflector made of black plastic was attached to the tip end of the remote control.

However, since a black color has a remarkably low degree of reflection of infrared rays, a flesh color paint was applied to the entire inside of the reflector and the pedestal of the remote control main body before performing the experiment.

Therefore, when this product is actually manufactured by integrating the reflector with the remote control main body, it is necessary to select, as the material made of plastic or the like, not a black material but a whitish material that reflects infrared rays.

In addition, it is also possible to manufacture the reflector and the pedestal using a material, such as aluminum, that significantly reflects infrared rays and attach them to the remote control main body, or to attach an aluminum or whitish plastic plate to the inside of the reflector.

In addition, it is also conceivable to apply a similarly-colored paint that is hardly peeled off.

Figures 1A, 7:
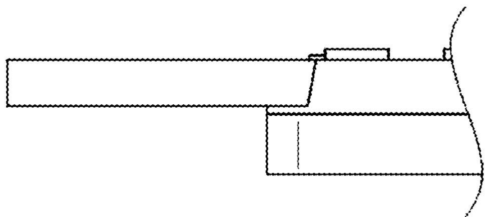
FIGS. 7-01A to 7-01D describe how infrared rays are reflected by the reflector.
Figures 1B, 7:
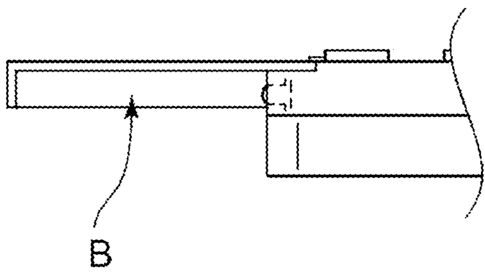
Figures 1C, 7:
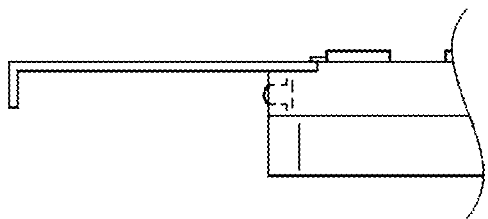
Figures 1D, 7:
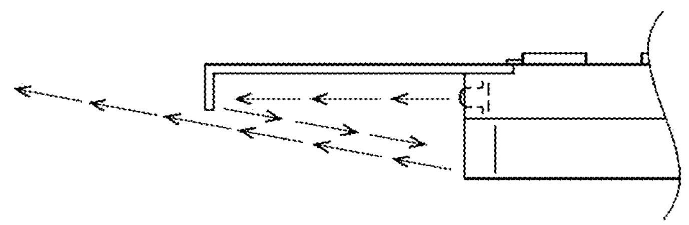
Figures 2E, 7:
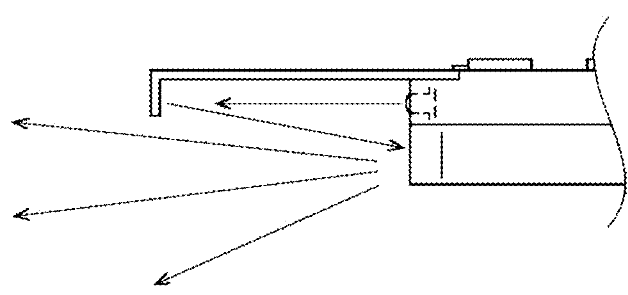

FIGS. 7-01D and 7-2E illustrate a mechanism in which infrared rays emitted from the infrared light covered by the front edge A are reflected by the inside of the front edge A, reflected by the pedestal, and then emitted beyond the front edge A.

Figures 2F, 7:
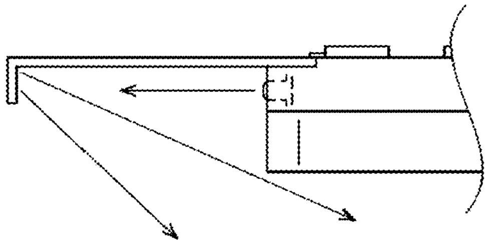

FIG. 7-02F illustrates that the front edge A reflects infrared rays in other directions than those illustrated in FIGS. 7-01D and 7-2E.

Figures 2G, 7:
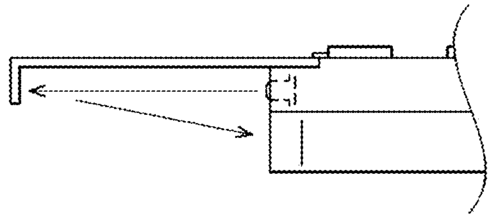
Figures 2H, 7:
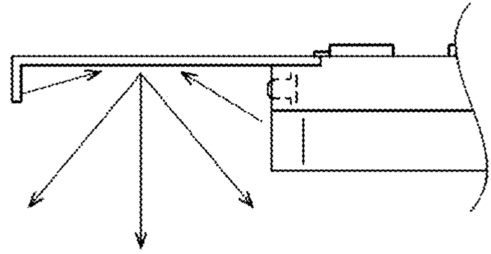

FIGS. 7-2G and 7-2H illustrate a mechanism in which infrared rays emitted from the infrared light covered by the front edge A are reflected by the inside of the front edge A, reflected by the pedestal, and then reflected again by the front edge A, the left and right side edges B and C, and the pedestal D.

Figure 8:
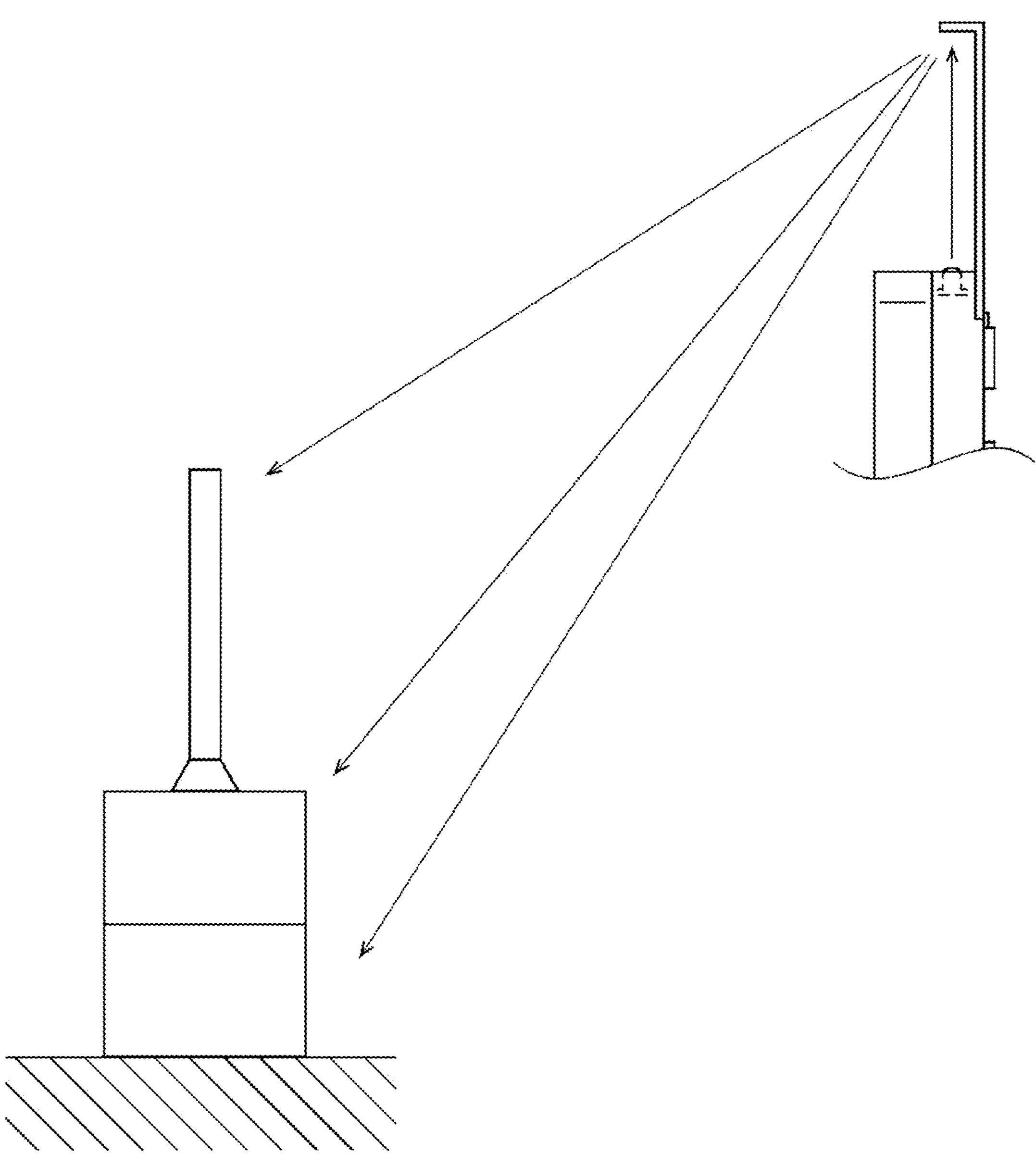
FIG. 8 illustrates a state in which the remote control including the reflector with the edges is actually used. This is a diagram illustrating that even in a case where the remote control including the reflector is erected, the target device installed on the lower side of the remote control can be operated.

FIG. 8 is a diagram in which the remote control is erected and the target devices such as a television and a DVD device placed on the floor are operated from above by the remote control.

Figure 9:
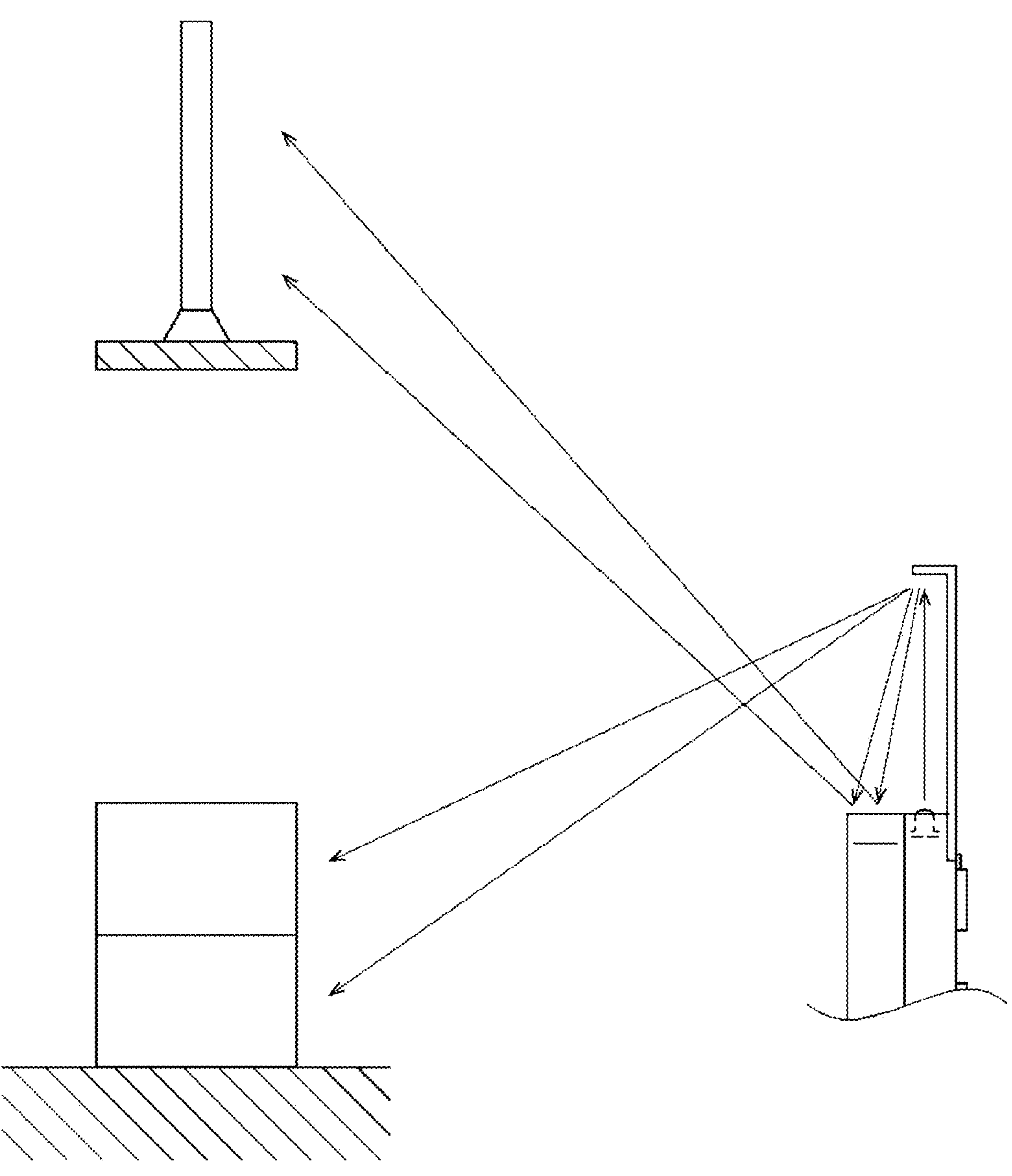
FIG. 9 is a diagram illustrating that even in a case where the remote control including the reflector is erected, the target device installed on the upper side of the remote control can be operated.

FIG. 9 is a diagram in which the remote control is erected and the target devices such as a television and a DVD device are operated from below and above by the remote control.

In a restaurant, a television is placed on a shelf, and a television or a DVD device is placed on the floor.

Figure 10A:
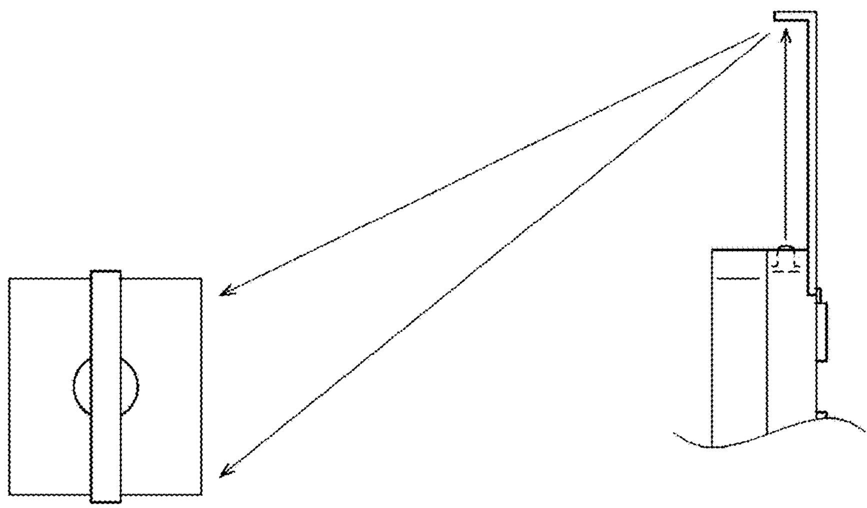
FIG. 10A is a diagram illustrating that even in a case where the user is lying on the bed, the user can operate the target device using the remote control.
Figure 10B:
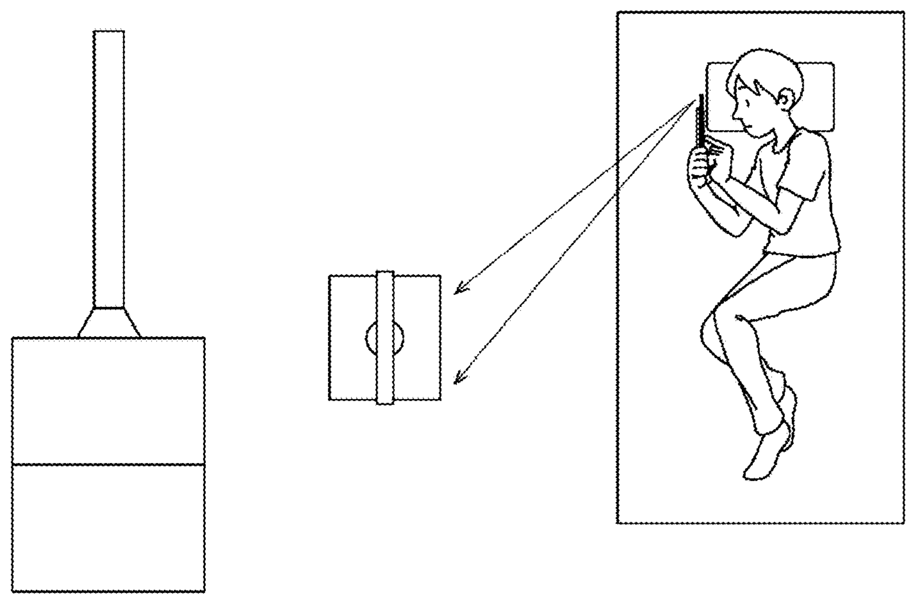
FIG. 10B is a diagram illustrating that even in a case where the user is lying on the bed, the user can operate the target device using the remote control.

FIGS. 10A and 10B are diagrams in which the remote control is placed sideways and a diagram in which the user is lying on the mattress on their right side and operating the target device such as a television and a DVD device using the remote control.

Figure 11A:
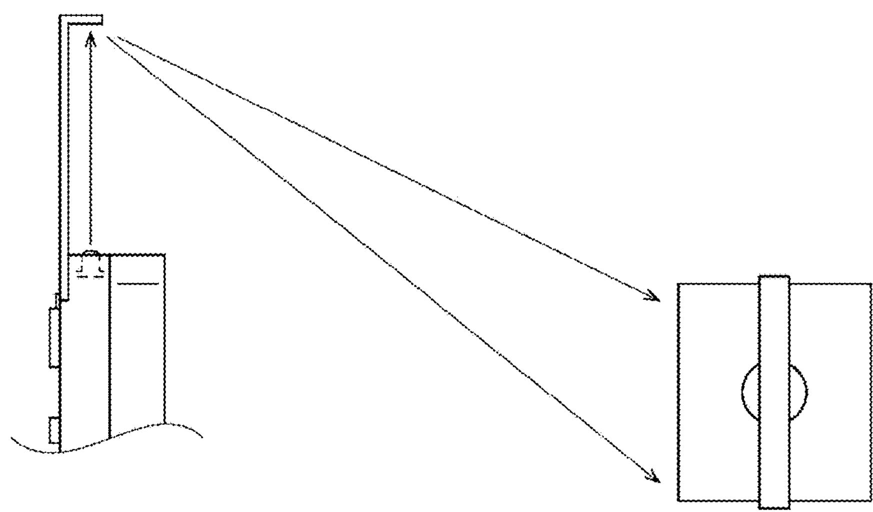
FIG. 11A is a diagram illustrating that even in a case where the user is lying on the bed in the opposite direction of FIGS. 10A and 10B, the user can operate the target device using the remote control.
Figure 11B:
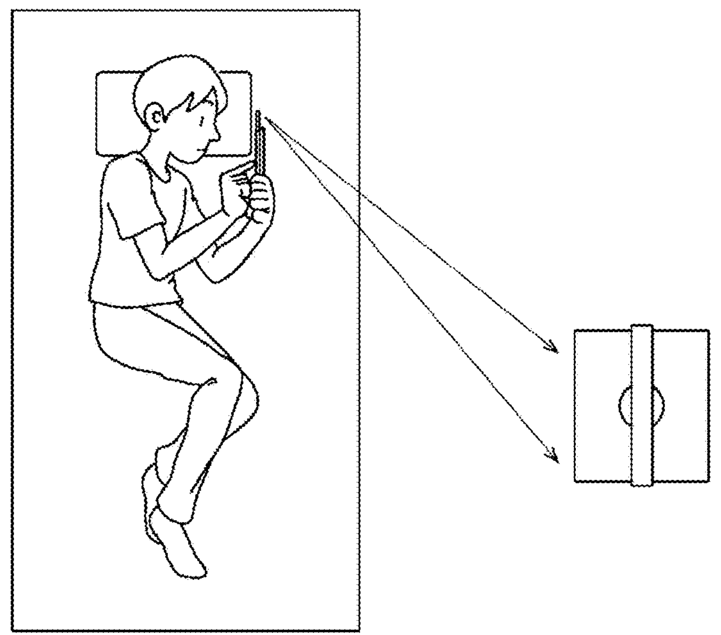
FIG. 11B is a diagram illustrating that even in a case where the user is lying on the bed in the opposite direction of FIGS. 10A and 10B, the user can operate the target device using the remote control.
Figure 12A:
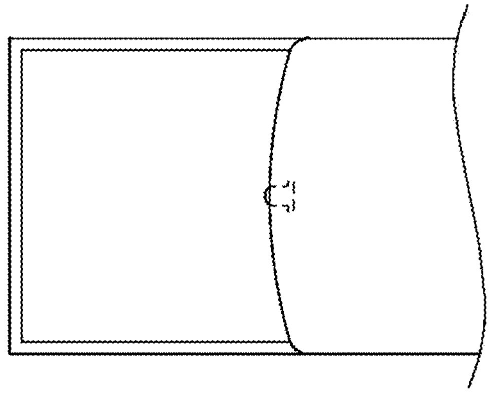
FIG. 12A is the same view as FIG. 4B, and is an enlarged view of the back surface of the reflector of the remote control in FIGS. 3A to 3D.
Figure 12B:
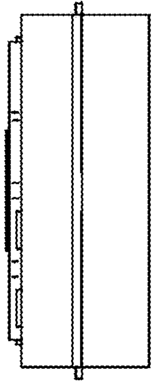
FIG. 12B is a view obtained by rotating FIG. 4C, which is the enlarged view of the side surface of the reflector of the remote control in FIGS. 3A to 3D, to the left by 90 degrees.
Figure 12C:
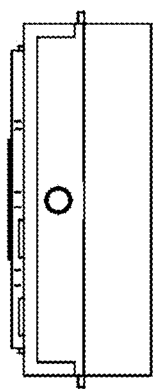
FIG. 12C is a cross-sectional view of the diagram in FIG. 12B.

FIGS. 11A and 11B are diagrams in which the remote control is placed sideways and a diagram in which the user is lying on the mattress on their left side and operating the target device such as a television and a DVD device using the remote control.

When the user operates the remote control while lying on the mattress as illustrated in FIGS. 10A, 10B and 11, the left and right side edges B and C of the reflector 4 serve to reflect infrared rays in the upper and lower directions.

Figure 13A:
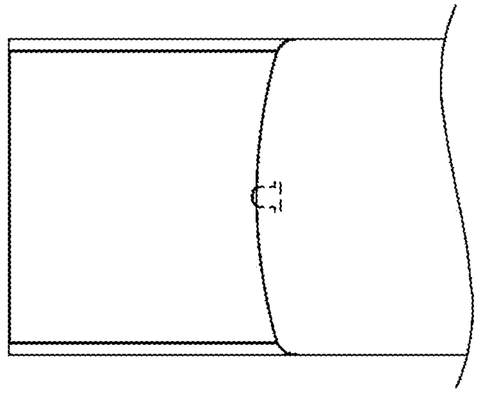
FIG. 13A is an enlarged view of the back surface of the reflector of the remote control, in which the front edge is omitted.
Figure 13B:
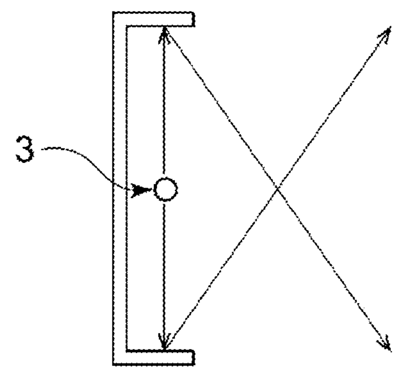
FIG. 13B illustrates reflection of infrared rays in FIG. 13A.
Figure 13C:
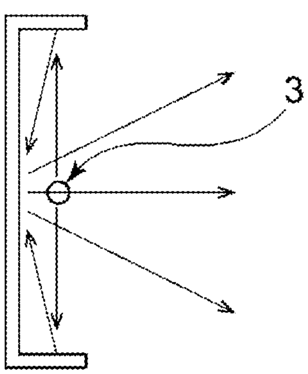
FIG. 13C illustrates reflection of infrared rays in FIG. 13B.

FIGS. 12A to 12C and 13 are diagrams illustrating that infrared rays are reflected in the upper and lower directions by the left and right side edges B and C (FIG. 13B and that infrared rays are reflected by the base D and are also reflected in the horizontal direction (FIG. 13C) even in a case where the remote control is turned sideways and operated.

In a case where the remote control is turned sideways and operated, the left and right side edges B and C serve to reflect infrared rays in the upper and lower directions as described above. Therefore, in a situation where the target device to be operated is located on the upper side of the place where the operation is performed, the side edge on the lower side reflects infrared rays in the upper and lower directions, and in a case where the target device is located on the lower side, the side edge on the upper side reflects infrared rays in the lower direction, to enable the device to be operated.

Figure 14:
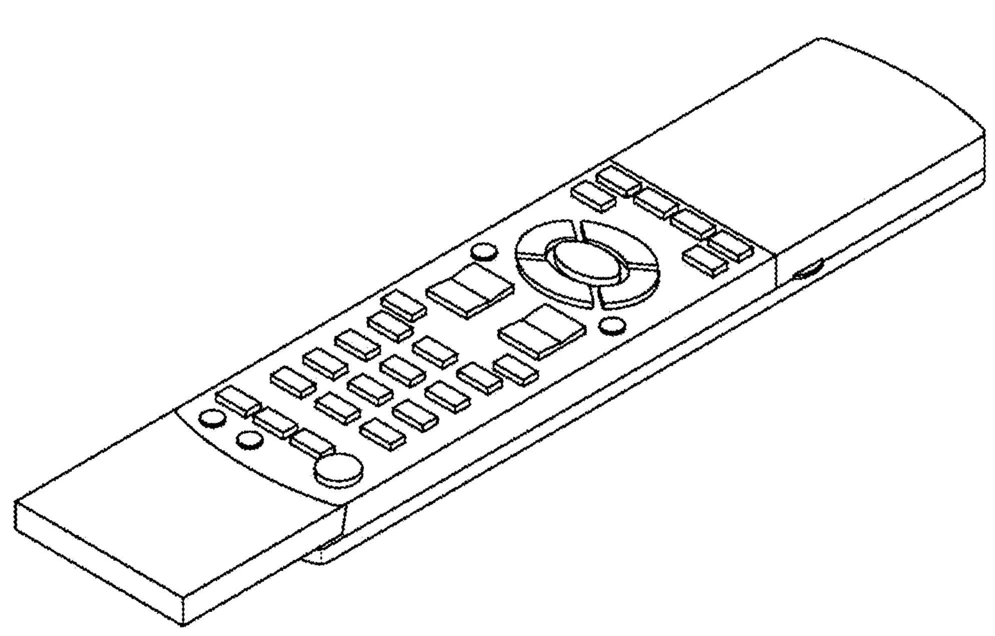
FIG. 14 is a perspective view of the entire remote control including the basic reflector according to the present invention.

FIG. 14 is a perspective view of the entire remote control including the basic reflector according to the present invention.

Figure 15A:
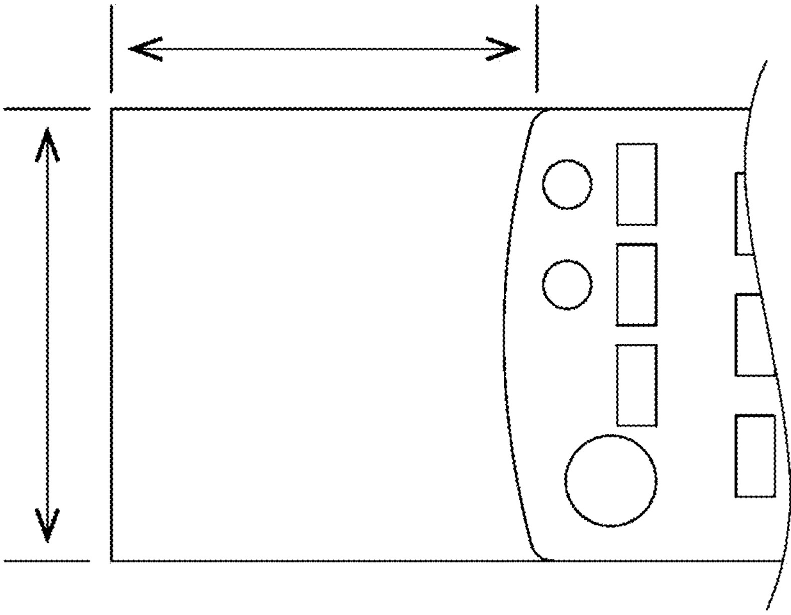
FIG. 15A is an enlarged view of the front surface of the reflector of the remote control according to the present invention, illustrating the length and width of the reflector.

The dimensions of the reflector will be described below. As illustrated in FIG. 15A, the lateral width of the reflector is substantially equal to that of the operation panel of the remote control.

As illustrated in FIG. 15A, the length of the reflector in the up-down direction is desirably 3 cm or more even for a small remote control. In addition, the normal-sized remote control is preferably 5 to 6 cm.

Note that, even the reflector whose length in the up-down direction is 30 cm can reflect infrared rays and enables the device to be operated, and this has been verified.

However, it is not practical without special conditions.

Figure 15B:
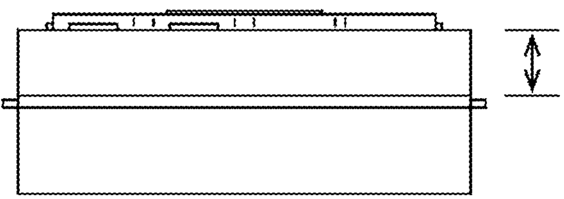
FIG. 15B is an enlarged view of the head portion of the reflector of the remote control according to the present invention, illustrating the height of the reflector.

As illustrated in FIG. 15B, the height of each of the edges (the front edge A, and the left and right side edges B and C) is about 5 mm to 10 mm, as a size corresponding to the size of the remote control currently distributed. However, the actual dimension is obtained by adding the thickness of the base D, and in a case where the thickness of the base D is 2 mm, the actual dimension is around 7 mm to 12 mm.

For the sake of convenience, the drawing of the box-shaped reflector with right angle edges has been used in the above description. As an improved reflector, as illustrated in FIGS. 16-01A to 16-01D, 16-02E and 16-02F, a reflector has been devised that efficiently reflects infrared rays in a wide range in necessary directions by widening the edges.

The reason why the edges are widened will be described.

Regarding the basic reflector in FIGS. 3A to 3D, each of the edges (the front edge A, the left side edge B, and the right side edge C) of the reflector is perpendicular to the base D (90 degrees).

This is effective for preventing diffusion of infrared rays and for focusing infrared rays.

However, in the case where the remote control is turned sideways, is operated at a short distance of 1 to 2 meters, and is away leftward or rightward from the device to be operated by 1 meter or more, there is a case where a large number of infrared rays is reflected to the outside of the device to be operated and the remote control does not function.

Figures 1A, 16:
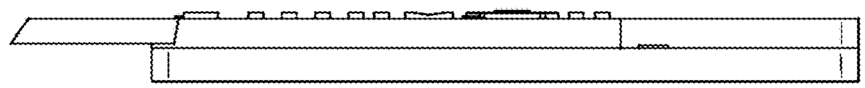
Figures 1B, 16:
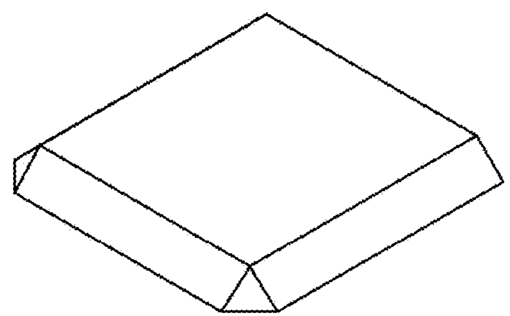
Figures 1C, 16:
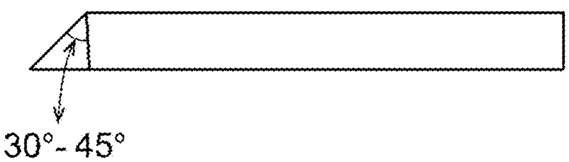
Figures 1D, 16:
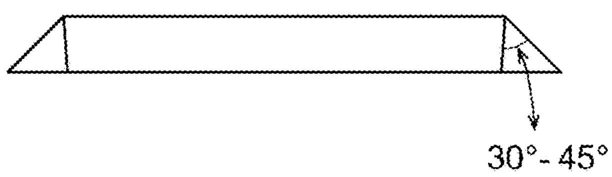
Figures 2E, 16:
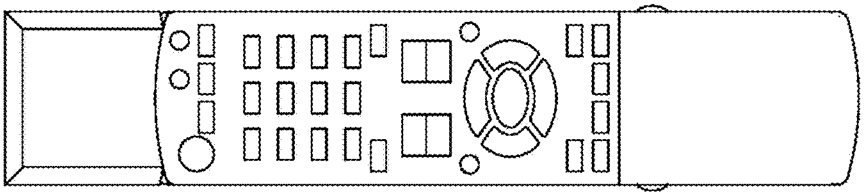
Figures 2F, 16:
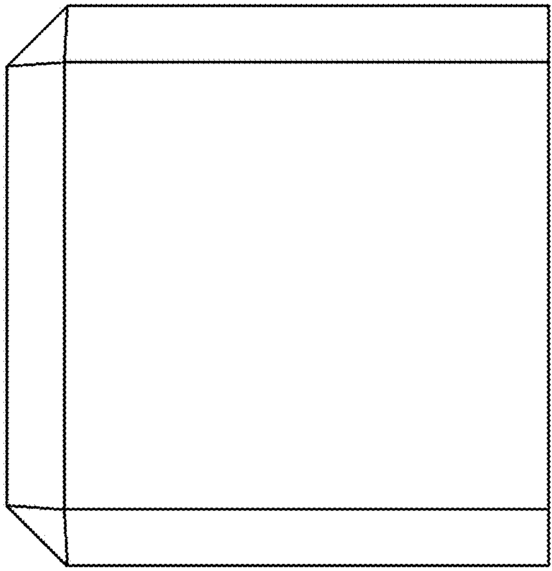
Figures 3G, 16:
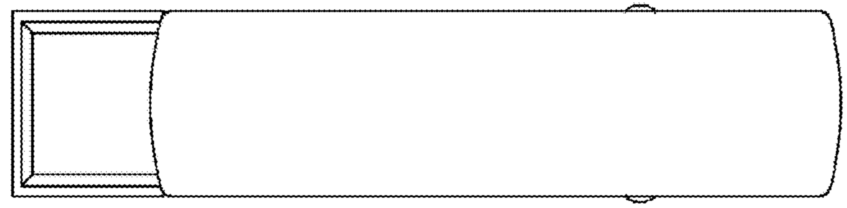
Figures 3H, 16:
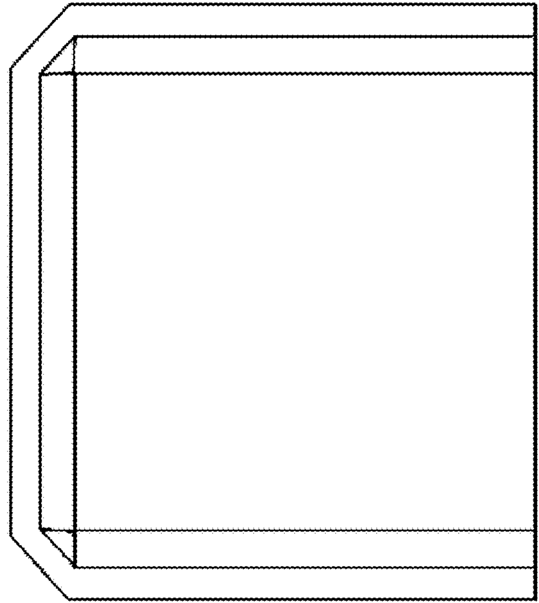
Figure 17A:
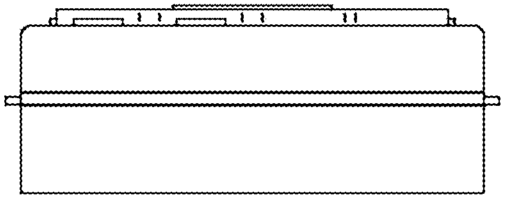
FIGS. 17A to 17D illustrate improvement to increase the strength of the edges of the reflector.
Figure 17B:
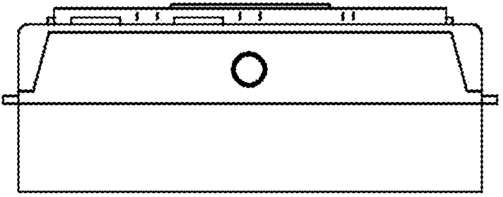
Figure 17C:
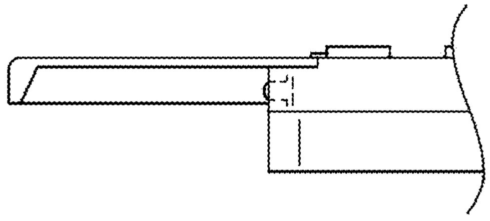
Figure 17D:
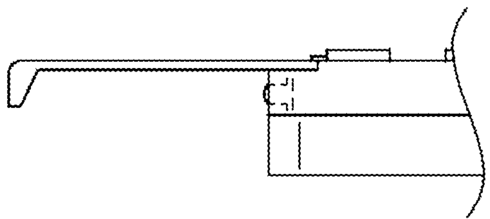

Therefore, as illustrated in FIGS. 16-01A and 16-1B, a reflector in which the front edge A, the left side edge B, and the right side edge C are widened has been devised.

As illustrated in FIGS. 16-01C and 16-01D, the angle at which each of the edges is widened is preferably 30 degrees to 45 degrees, which minimizes unnecessary diffusion, and enables infrared rays to be efficiently reflected in a wide range in the upper, lower, right, and left directions even in a case where the user aims the tip end of the remote control to the device to be operated, erects the remote control, or turns the remote control sideways and operates it.

In consideration of productivity, durability, and practicability, the following reflector has been devised as a reflector suitable for standardization (FIGS. 17A to 17D).

Each of the edges (the front edge A, and the left and right side edges B and C) is a triangular edge, which has been devised with further emphasis on productivity and durability. It contributes to durability by strengthening the thin operation panel (FIGS. 17A to 17D).

Figure 18A:
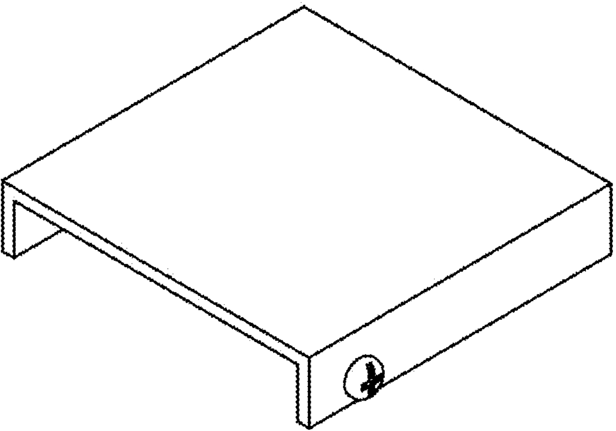
FIGS. 18A and 18B are diagrams illustrating members for simply attaching the reflector to a ready-made remote control.
Figure 18B:

The reflector may simply be attached to a ready-made remote control as illustrated in FIGS. 18A and 18B. The reflector may be attached to the remote control using screws, or the reflector may be attached to the remote control using an adhesive.

Scope of Present Embodiment

As described above, the present invention has been described according to the present embodiment, but the description and drawings constituting a part of this disclosure do not limit the present invention. In this manner, the present invention includes various embodiments and the like not described herein.

The invention claimed is:

1. A remote control comprising:

a main body having an infrared lamp at a tip end portion;

a reflector attached to the tip end portion of the main body so as to cover the tip end portion, the reflector controlling reflection of infrared rays emitted from the infrared lamp; and a pedestal attached to one surface in a thickness direction of the main body, wherein the reflector is formed in a hollow shape with at least one side in the thickness direction being open, and has an opposing reflection surface that faces the tip end portion and reflects infrared rays emitted from the infrared lamp, wherein the pedestal has a re-reflection surface capable of re-reflecting infrared rays reflected from the reflector toward an emission direction of the infrared rays emitted from the infrared lamp.

2. The remote control according to claim 1, wherein the reflector is formed from a front edge having the opposing reflection surface, a pair of a left side edge and a right side edge connected to both ends of the front edge in a direction intersecting the thickness direction, and a base connecting the front edge and the pair of side edges.

3. The remote control according to claim 2, wherein edges of the front edge and the pair of side edges are widened.

* * * * *